United States Patent [19]

Sanborn, Jr.

[11] 4,246,288
[45] Jan. 20, 1981

[54] RECLOSABLE PACKAGE

[75] Inventor: Philip A. Sanborn, Jr., Spartanburg, S.C.

[73] Assignee: W. R. Grace & Co., Duncan, S.C.

[21] Appl. No.: 65,301

[22] Filed: Aug. 9, 1979

[51] Int. Cl.³ .......................... B65D 5/54; B65D 43/06
[52] U.S. Cl. ................................ 426/122; 24/201 C;
150/3; 229/43; 229/45 R; 426/123; 426/129;
426/130; 426/396
[58] Field of Search ............... 426/396, 129, 126, 127,
426/122, 123, 130; 150/3; 24/201 C; 229/45 R,
43

[56] References Cited

U.S. PATENT DOCUMENTS

| | | | |
|---|---|---|---|
| Re. 28,969 | 9/1976 | Naito | 150/3 |
| 2,941,660 | 6/1960 | Tupper | 150/0.5 X |
| 2,978,769 | 4/1961 | Harrah | 150/3 |
| 3,172,443 | 3/1965 | Ausnit | 24/201 C |
| 3,219,084 | 11/1965 | Ausnit | 24/201 C |
| 3,226,787 | 1/1966 | Ausnit | 24/201 C |
| 3,338,285 | 8/1967 | Jaster | 24/201 C |
| 3,380,481 | 4/1968 | Kraus | 24/201 C |
| 3,473,589 | 10/1969 | Gotz | 150/3 |
| 3,556,337 | 1/1971 | Harmon et al. | 426/129 |
| 3,565,147 | 2/1971 | Ausnit | 150/3 |
| 3,659,393 | 5/1972 | Richter | 426/396 |
| 3,676,159 | 7/1972 | Fallowfield | 426/129 |
| 3,679,511 | 7/1972 | Ausnit | 150/3 |
| 3,685,562 | 8/1972 | Ausnit | 24/201 C X |
| 3,780,781 | 12/1973 | Uramoto | 150/3 |
| 3,784,432 | 1/1974 | Noguchi | 156/244.25 |
| 3,787,269 | 1/1974 | Noguchi | 156/244.25 |
| 3,792,181 | 2/1974 | Mahaffy et al. | 426/129 |
| 3,827,472 | 8/1974 | Uramoto | 150/3 |
| 3,853,671 | 12/1974 | Ausnit | 24/201 C |
| 3,903,309 | 9/1975 | Manaffy et al. | 426/129 |
| 4,058,212 | 11/1977 | Wyslotsky | 229/45 R |
| 4,058,953 | 11/1977 | Sanborn et al. | 426/396 |
| 4,124,141 | 11/1978 | Armentrout et al. | 229/43 X |

FOREIGN PATENT DOCUMENTS 998363  10/1976  Canada .................................. 24/201 C Primary Examiner—Steven L. Weinstein
Attorney, Agent, or Firm—John J. Toney; William D. Lee, Jr.

[57] ABSTRACT

This invention relates to a reclosable package including a semi-rigid receptacle and a flexible cover and an interlocking rib and groove closure strip which allows the package to be reclosable.

4 Claims, 10 Drawing Figures

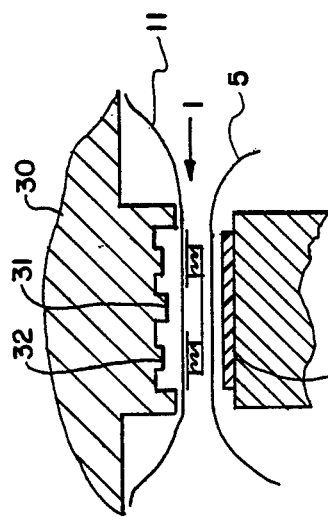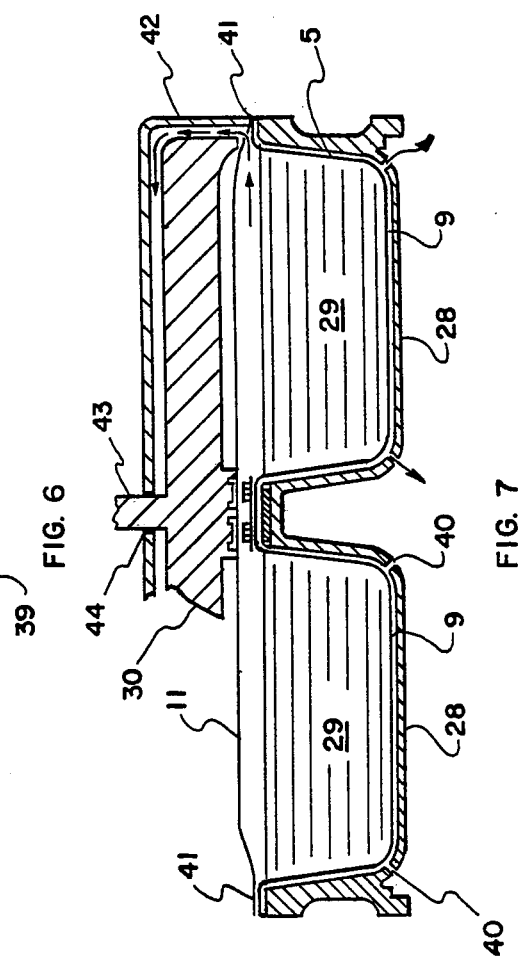

RECLOSABLE PACKAGE

FIELD OF INVENTION

This invention relates to a reclosable package: and, specifically, this invention relates to a reclosable package for food products such as cured or sliced processed meats and cheeses where the package is evacuated and/or gas flushed and hermetically sealed.

BACKGROUND

A substantial volume of the cheese, bacon, frankfurters, sliced luncheon meat and other processed meats are sold in packages which are formed from flexible thermoplastic materials. The freshness of the product within the package is to a large measure dependent upon the fact that the thermoplastic package is hermetically sealed and has been evacuated and, in some instances, gas flushed. However, in many instances, when an evacuated package of this type is purchased not all of its contents are used at once by the consumer. When the initial seal has been broken and part of the product removed it is difficult to reclose the package for satisfactory storage in a refrigerator; and, in order to preserve the contents in a fresh state without loss of flavor and texture, it is often necessary to completely repackage the product. To overcome this problem, there are many prior art package designs which offer means of opening and resealing but many of these have the disadvantage that wordy printed directions are needed and many times the thermoplastic packaging material is so stiff and so strong that even a carefully designed reclosure device can be destroyed. Thus, it is one object of the present invention to provide a strong, reliable means of resealing and closing a thermoplastic package which has been previously vacuum sealed.

Another object of the present invention is to provide a reclosable package which may be made on a single machine in a straight-through process rather than making a pouch on one machine and then performing the filling, evacuating, and sealing process on another machine.

Another problem which is encountered with prior art reclosable packages is the problem of manufacturing them at a commercially acceptable rate. Placing tear tabs, tear strips, or the like in combination with resealing means such as pressure sensitive adhesive strips calls for extreme care in registration and alignment of each of the packaging components and rather precise sealing must take place in order to achieve a satisfactory product. Accordingly, another of the objects of the present invention is to provide a reclosable package which may be made rapidly and reliably.

The above objects and advantages of the present invention will be readily apparent to those skilled in the art from the description and drawings which follow below.

DISCLOSURE STATEMENT

Below are described patents which are believed to be pertinent to the present disclosure.

U.S. Pat. No. 3,219,084 issued on Nov. 23, 1965 to Steven Ausnit et al and describes a method of making pouches with reclosable closure strips by forming a pair of pouches which are initially interconnected at the top through a double joined fastener which is subsequently severed to make two separate bags.

U.S. Pat. No. 3,226,787 which issued to Steven Ausnit on Jan. 4, 1966 describes an improved flexible closure structure for pouches and bags wherein the closure structure is formed as a flexible integral sheet or as a pair of sheets by being extruded from a single pair of die openings shaped to form the elongated sheet with integral laterally spaced linearly extending interlocking portions on the sheet. The interlocking fastener elements are facing each other so that they may be mated or joined by the being pressed together without altering position.

U.S. Pat. No. 3,380,481 issued on Apr. 30, 1968 to O. K. Kraus and describes an elongated flexible closed one-piece tube having integrally formed longitudinally continuous interlocking elements formed thereon for slitting, cutting, and sealing to form closable and reusable pouches or bags therefrom.

U.S. Pat. No. 3,473,589 issued on Oct. 21, 1969 to Waldrop O. Gotz and describes a closure material having flexible pressure interlocking releasable fasteners or interlocking elements extending therealong for forming bags or similar articles for containing items such as perishable goods.

U.S. Pat. No. 3,780,781 which issued on Dec. 25, 1973 to Tatsuro Uramoto discloses a bag structure having strips with interlocking rib and groove profiles fused to the inside of the bag mouth to close the bag and adjacent reinforcing strips are provided for tear guidelines for tearing off the top of the bag.

U.S. Pat. No. 3,784,432 which issued on Jan. 8, 1974 to Takashi Noguchi describes a means and method of attaching a fastener profile to a plastic sheet.

U.S. Pat. No. 3,787,269 which issued on Jan. 22, 1974 to Takashi Noguchi describes a means and method for attaching interlocking strips to laminated sheets of plastic.

U.S. Pat. No. 3,827,472 which issued on Aug. 6, 1974 to Tatsuro Uramoto describes a flexible bag structure with interior interlocking rib and groove profiles to close the top of the bag with adjacent tear strip means to tear off the top of the bag.

U.S. Pat. No. 3,853,671 which issued on Dec. 10, 1974 to Steven Ausnit describes a mechanism and method for making material for multiple plastic bags with reclosable fasteners thereon.

U.S. Pat. No. Re. 28,969 which was reissued on Sept. 21, 1979 to Kakuji Naito shows a reclosable plastic bag having interlocking rib and groove elements integral with the plastic of the bag with the elements being designed so that the bag opens easily from the outside but resists opening from the inside.

U.S. Pat. No. 4,058,953 which issued on Nov. 22, 1977 to Philip A. Sanborn, Jr. describes a packaging machine for forming, evacuating, and sealing thermoplastic packages.

SUMMARY OF THE INVENTION

In one aspect, the subject invention is a reclosable package comprising first and second thermoplastic sheets, at least one of which is thermoformable; and, a closure strip and a product enclosed between said sheets by a continuous peripheral seal, the product being located in said cavity; and, one side of said closure strip being sealed to one sheet and another side being sealed to the other sheet, each end of said sheet terminating adjacent or in said peripheral seal so that said strip is between a portion of said peripheral seal and said product whereby when said portion of the peripheral seal is ruptured or cut or torn away the closure strip may be manually pulled apart for access to the product.

In another aspect, the subject invention is a reclosable package which comprises a product; a thermoplastic forming web having a cavity formed therein with a peripheral flange around the opening to said cavity, said cavity containing the product; a closure strip having one surface thereof sealed to the forming web, said strip being adjacent and parallel to but spaced apart from one edge of the forming web, a portion of the strip at each end thereof having an indentation; and, a covering web sealed to the peripheral area of said forming web thereby hermetically enclosing the product and closure strip, the indentation at each end of said strip permitting a continuous, smooth seal between said covering web, forming web, and closure strip in the vicinity of said indentations.

DESCRIPTION OF THE DRAWINGS

In the drawings which are attached hereto and made a part of this disclosure:

FIG. 6 is a cross-sectional representation of the seal bars which seal the longitudinal center seal between the covering and forming webs and the seal bar which seals the closure strip to the upper web;

FIG. 7 is a cross-sectional representation of an evacuation and sealing station showing the position of the seal bars of FIG. 6 with respect to the filled forming web cavities of the package of the present invention;

DETAILED DESCRIPTION

Figure 1:
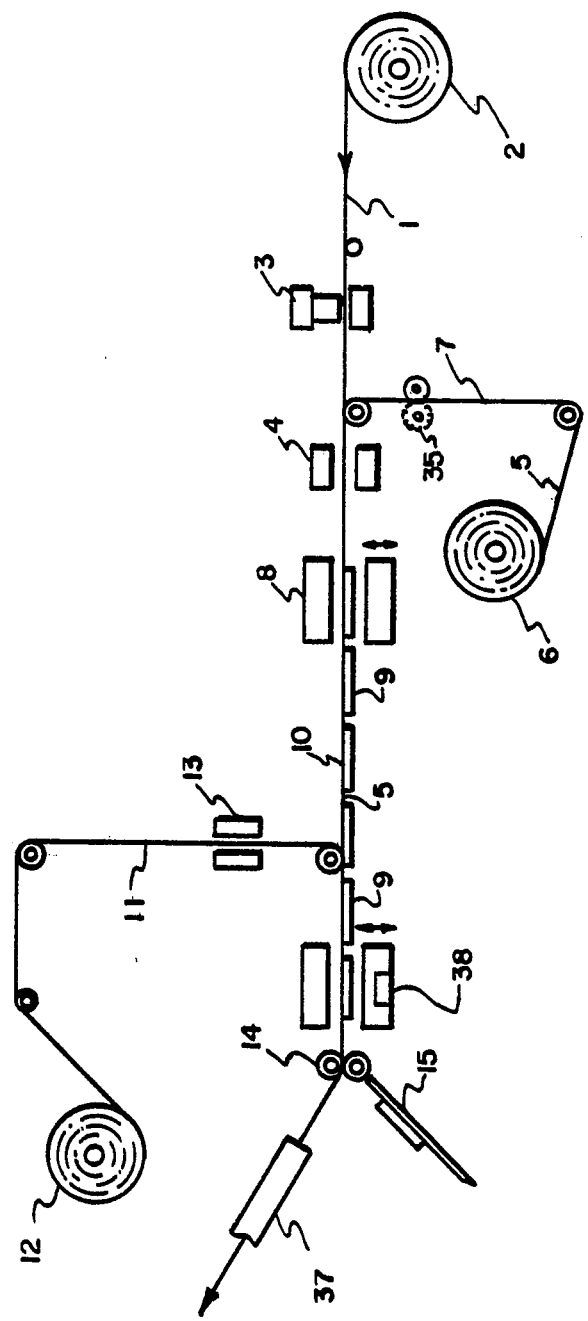
FIG. 1 is a schematic representation of the apparatus which performs the process according to the present invention.
Figure 2:
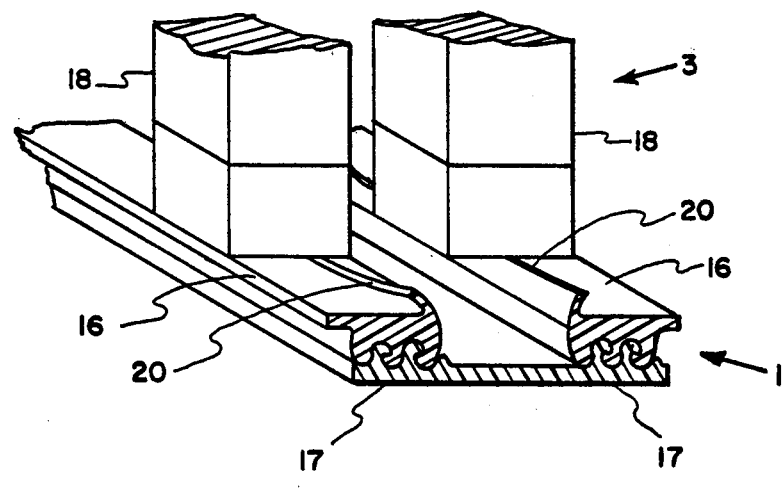
FIG. 2 is perspective representation of the means for forming an indentation in a closure strip according to the present invention.

Referring principally to FIG. 1, the apparatus and process of the subject invention will be described as well as the package which the process and apparatus produce. The closure strip 1 which provides the reclosable feature of the package of the present invention is supplied from supply roll 2 and is advanced or fed to the closure die punch assembly 3. This assembly and the punching performed at this station can be better appreciated by viewing FIGS. 2, 3, and 4 where punches 18 are shown in position to punch out the indentation 19 in the closure strip 1. In FIG. 2 the punching operation has just begun and in FIG. 3 the punching step has been completed and the result of the punching or strip removal can be better appreciated by reference to the top plan view in FIG. 4 of the closure strip.

The closure strip as shown is a double strip which supplies the closure element of strip 1 for two or more packages. The strip 1 comprises the male or rib portion 17 which interlocks into the female or grooved portion 16. As shown, there are two interlocking ribs which extend longitudinally on the rib portion 17 which snap fit into the corresponding longitudinal grooves on the groove or female portion 16. The present invention is not limited to any particular number of interlocking ribs and grooves as satisfactory closure strips can be made with one rib and one groove or with a plurality of ribs and grooves. The main criteria are that the rib and groove portions of the closure strip be readily separable by the fingers of the consumer who has purchased the package and that they be readily reclosable.

Figure 3:
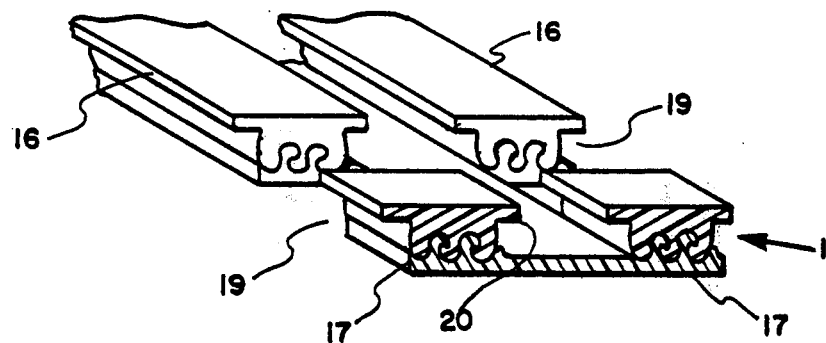
FIG. 3 shows the closure strip after an indentation has been made therein.
Figure 4:
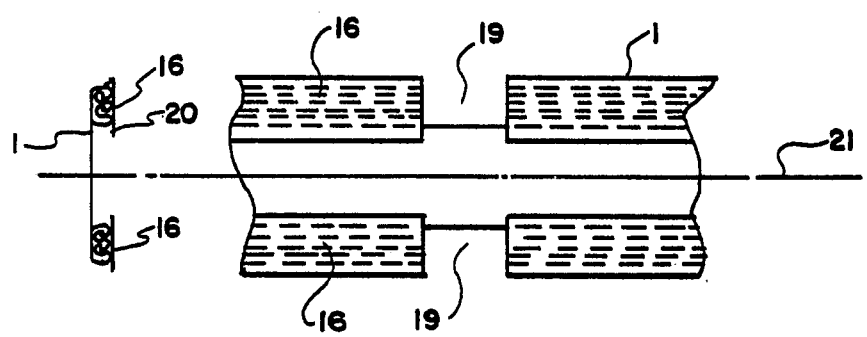
FIG. 4 shows a top plan view and a side view of the closure strip with the indentation been made in the strip according to the invention.

Still referring to FIGS. 2, 3, and 4 it should be noted that the groove portion or element 16 of the closure strip has a flange which is integral with the top surface of the closure strip and this provides for additional seal surface area between the groove 16 and the covering web or upper thermoplastic film. The flange which connects the ribbed portions 17 of the closure strip also provides a larger seal surface for sealing to the forming web or lower thermoplastic film in addition to connecting the two segments of the closure strip. It should be understood, of course, that the present invention could be practiced without having two connected closure strips but for ease in production and assembly it is economical to use the two side-by-side connected closure strips so that two or more packages can be made at the same time. Furthermore, there is no necessity for the rib portion to be on the lower closure strip segment or on the upper segment as the closure strip will function properly either way.

As shown in FIG. 2 the flange portion of the upper segment of the closure strip 1 has been folded over by a folding shoe which is not shown so that the punches 18 can punch out the entire upper flange and entire interlocking elements in one stroke and still leave enough material in the lower flange so that the strip will not be too weakened and break as it is advanced toward the forming web. The purpose for making the indentation or punch out in the closure strip is so that a smooth, fast, and secure peripheral seal can be made for the package as will be more fully described hereinafter.

Returning now to FIG. 1, the closure strip is advanced from the die punch assembly 3 to the closure strip seal station 4 where it meets the first thermoplastic sheet or forming web 5 which is fed and advanced from supply roll 6 through registration station 7 past a pair of perforating scoring wheels 35 and over a roller to meet the closure strip 1 at the closure strip seal station 4. Both the closure strip 1 and the forming web 5 are made from thermoplastic materials with the closure strip preferably being made from polyethylene or an ionomer and the forming web being thermoformable and preferably being a laminate of nylon and polyethylene which laminate in some instances will have multiple layers of these materials and, in addition may have a gas barrier layer or layers from material such as saran or hydrolyzed ethylene-vinyl acetate copolymer. The closure strip 1 is heat sealed to the forming web at the seal station and the sealing means can be either a plate and roller whereby the roller presses the strip against the heated plate as the closure strip 1 and forming web 5 pass thereover or a heated roller can press the strip or sheet against a backing surface. Another and preferred means of sealing is to use the combination of a heated plate and backing plate and when the motion of the sealing strip and forming web is stopped the web and strip are pressed together between said plates whereby the seal is completed during the stop. Both continuous sealing and intermittent between two thermoplastic surfaces is well known and within the skill of the art.

Figure 9:
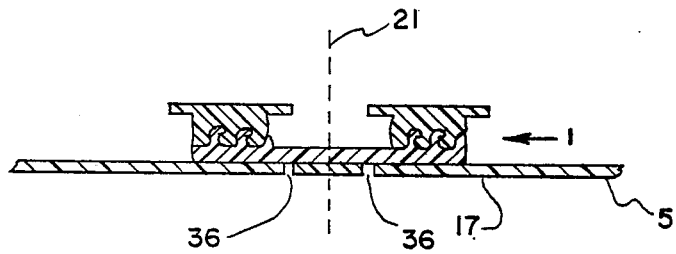
FIG. 9 is a cross-sectional representation of a closure strip showing the strip sealing perforations or scores in the covering web; and, FIG. 10 is a perspective view of a package according to the present invention.

The closure strip is sealed over the score line or perforations 36 in the forming web 5 as shown in cross-section in FIG. 9. The score lines or perforations 36 were placed in the film web 5 by the scoring or perforating wheels 35 whose position is shown in FIG. 1. This pair of wheels (only one is visible in FIG. 1) simply punch out two lines of small holes in the forming web as the web passes between them and the backing roller, one line of perforations being made for each package. Instead of perforating wheels which punch holes in the web, scoring wheels may be used which "score" or press or cut a score line which cuts into the surface of the web but does not cut completely through the web. This score line may be continuous or intermittent.

Referring again to FIG. 1, after the closure strip has been sealed to the forming web at station 4 the forming web moves to forming station 8 where cavities or pockets are formed in the forming web. The forming web is first clamped around the periphery of the forming die cavity, heated to its forming temperature and drawn by pressure differential into the die cavity where it is formed and cooled. In FIG. 7 the cross-section of the evacuation and sealing station 38 is shown and the pocket 28 closely resembles a forming cavity at forming station 8. The pressure differential is applied through the ports 40 to draw the forming web into the cavity for thermoforming. In FIG. 7 the position of the closure strip 1 at the sealing station is also shown. At this point the formed pockets 9 have been made and the closure strip 1 is securely sealed to the forming web in the area between the pair of pockets 9 as can be seen in FIG. 9.

After leaving the forming station 8 as shown in FIG. 1, the pockets are moved to loading station 10 where the product is placed in the pockets. Almost any type of product can be packaged but specifically the present invention is intended for food products such as sliced meat products including bacon and sliced breakfast meats, luncheon meats, cheeses and the like.

After the product has been loaded into the pockets, the loaded pocket is then advanced to meet the second thermoplastic sheet or covering web 11 which is fed from covering web supply roll 12 and passes through a web registration station 13 on its way to be laid over the pockets to enclose the product and closure strip between the first and second thermoplastic sheets. The covering web is also a thermoplastic sheet, preferably a nylon or polyester/polyethylene laminate, but of lighter gauge than the forming web so that it is not generally considered to be a formable film because it will not readily extend. The covering web also may include a layer of gas barrier material such as saran or hydrolyzed ethylene vinyl acetate copolymer and may be printed with the label of the particular packer. The polyethylene or ethylene vinyl acetate copolymer layers generally serve as sealing layers and sometimes an ionomer may be used for these layers.

Figure 8:
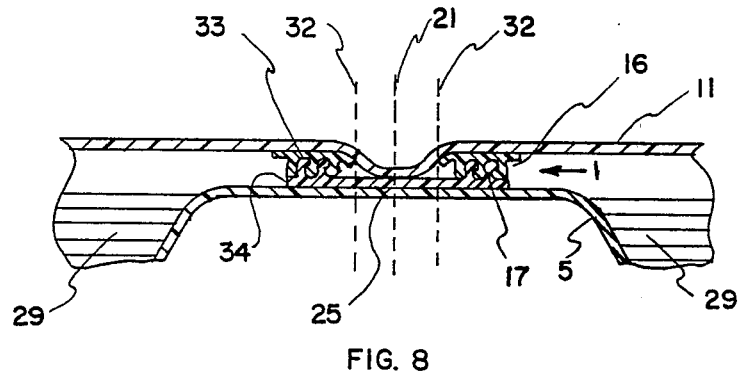
FIG. 8 is a cross-sectional representation of a portion of the package of the present invention showing the arrangement of the seals or enclosure strips prior to packages being severed one from the other.

When laid over the pockets filled with product 29, the covering web 11 covers the pockets as shown in FIG. 7. This assembly as shown in FIG. 7 in cross-section is the sealing and gas flushing and evacuation station 38 where the final package seals are to be made. The peripheral seals are made along the area 41 and the center seal is made between the pockets. While in the station 38 the webs are clamped together between outer wall 42 and pocket 28 generally in the area 41. The space between the two webs 5 and 11 which contains the product in the cavity 9 may be evacuated in any one of many different ways and the present invention is not to be limited to any particular method of evacuating the package as many are available in the prior art. Actually, the evacuation or gas flushing station 38 is really a vacuum chamber and in some methods the webs may be kept separated by either applying a vacuum above covering web 11 at the same time that vacuum is applied through ports 40 to the forming web to separate the two webs so that they may be evacuated through the separation. In other designs the peripheral area 41 may be completely sealed and then the upper web 11 is drawn against a vacuum port containing a knife to slit the upper film 11 so that the package may be evacuated through the slit before the slit is resealed. In the preferred design as shown, the upper web 11 is pre-slit to serve as an evacuation port (see arrows indicating flow of air) and this pre-slit web is then finally sealed by a seal bar 30 when the center seal is made. In any event, after the evacuation of the package is completed and gas filled, if desired, the final sealing takes places and is shown in greater detail in FIG. 6 where resilient seal member 39 serves as the backing pad for the seal bar 30. At this point the lower or forming web 5 has already been sealed to closure strip 1 and as the seal bar 30 is lowered the peripheral seal is made closing the evacuation slit (see FIG. 7) and the center seal bar face makes the main center seal between the packages as it is pressed downwardly while the closure strip seal bar face 32 seals the upper surface of the closure strip 1 to the upper or covering web 11. When this sealing step has been accomplished the cross section in an exploded fashion of the area shown in FIG. 6 can be seen better by looking at FIG. 8. The center seal 25 is shown where the upper web 11 is sealed to the flange between the closure elements and the closure elements on the closure strip are sealed to the lower web 5. Center line 21 notes the cut line between the packages and the line 32 is the line along which the package can be cut or if a score line or perforations are placed along this line (see FIG. 9) such as the perforations 36 then the package can be torn open along this line. This removes the outer hermetic seal and exposes the closure strip to manual opening by gripping each severed flange and pulling the closure strips apart. After they have been pulled apart they may be readily pressed together for resealing.

Figure 5:
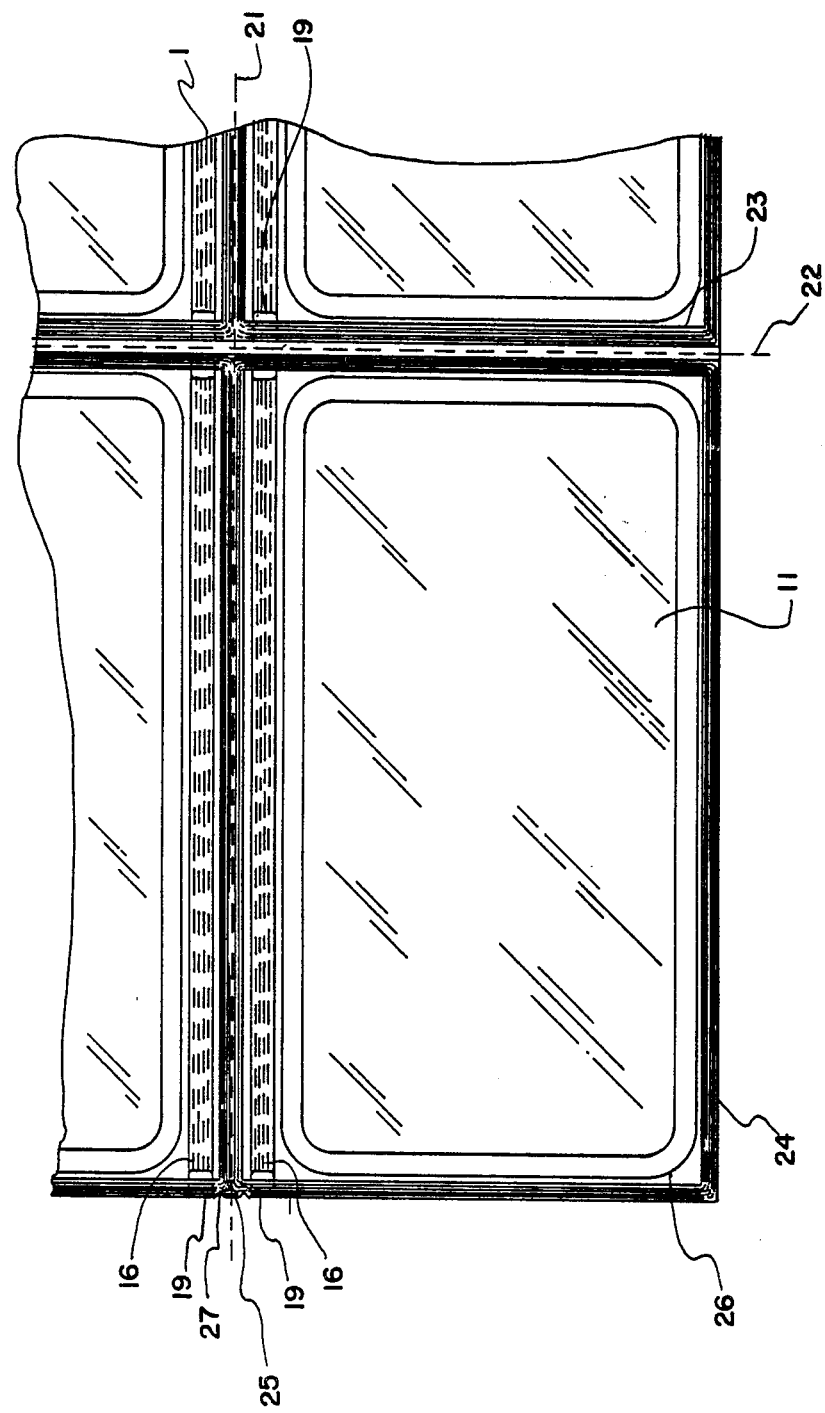
FIG. 5 is a top plan view of a package according to the present invention prior to its being severed from adjacent and trailing packages.

A top plan view of a package with one end having been trimmed by cutter 14 (see FIG. 1) so that vacuum 37 carries away the trimmed portions is shown in FIG. 5 and the longitudinal cut line 21 is shown as well as the transverse cut line 22 between package s als. A tear tab notch 27 may be provided in which the line o perforations terminates or a slit may be substituted for the notch. This provides the starting point for a tear line to tear along the perforations 36 which are not shown in FIG. 5 but which are shown in their proper positions in FIG. 9. The top of the closure elements 16 as shown in FIG. 5 and the peripheral seal 24 which is the longitudinal outside edge seal is also shown along with the transverse seal 23 between each package. The indentation 19 for each package seal is shown and as can be seen the indentation 19 provides for a smooth continuous transverse seal. If the indentation 19 were not provided then the continuous closure strip in this area would present a large mass of material which would have to be melted and pressed down at this point in order to ensure that complete sealing was achieved. To apply sufficient energy to melt this mass of material in a short period of time would require is impractical and to hold the seal bars in a dwell position that for a sufficient period of time in order to melt the seal would require a very slow process. By providing an indented closure strip these sealing problems are avoided.

As a practical matter it is more economical to continuously manufacture the sealing strip and then indent or punch out the unnecessary portions. However, in some instances it might be feasible to manufacture the indentations in the closure strip but, if this were done, it would limit such a closure strip to a certain length package whereas in the process of this invention the punch may be timed to punch at the exact pocket length. The pocket outline 26 shown in FIG. 5 can be varied in any machine by using appropriate dies.

Figure 10:
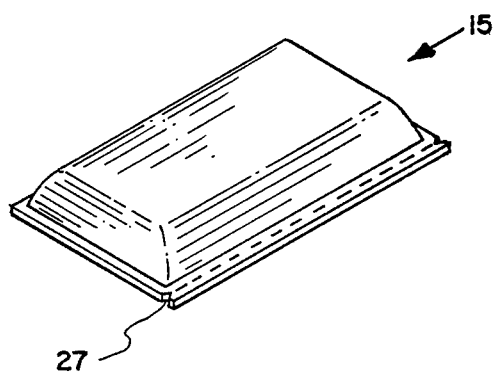

The finished package 15 has an appearance as shown in FIG. 10 and this package may be readily reopened and resealed.

Having thus described my invention I claim:
1. A reclosable package comprising:
   (a) a product;
   (b) a semi-rigid, thermoplastic forming web having a cavity formed therein with a peripheral flange having a continuous sealing surface around the opening to said cavity, said cavity containing said product;
   (c) a separable reclosable, flexible, thermoplastic two part interlocked closure strip with each part comprising longitudinal, interlocking rib and groove elements and each part having a sealing surface with one sealing surface thereof sealed to said sealing surface of said forming web, said strip being adjacent and parallel to but spaced apart from one edge of the forming web, said strip extending substantially the length of said edge, and a portion of the strip at each end thereof having an indentation; and,
   (d) a flexible covering web sealed by a peripheral heat seal to the sealing surface of the peripheral flange of said forming web hermetically enclosing the product and closure strip, said covering web being sealed to the other sealing surface of said closure strip, the indentation at each end of said strip permitting each end of said closure strip to terminate in the peripheral seal in a continuous, smooth seal between said covering web, forming web, and closure strip whereby said hermetically sealed package may be opened from one side by severing or tearing the covering or forming web or both between said closure strip and adjacent peripheral seal and thereafter separating the closure strip parts to gain access to the product.

2. The reclosable package of claim 1 wherein said forming web includes a series of perforations therein to form a tear line parallel to said closure strip, said perforations being sealed by a portion of said closure strip.

3. The reclosable package of claim 2 wherein each end of said tear line terminates in a notch in the sealed peripheral area in opposite sides of said package.

4. The reclosable package of claim 3 wherein said indentations are punched out portions of said closure strip.

* * * * *